(No Model.)
W. A. JAMESON.
SWIVEL.
No. 556,929. Patented Mar. 24, 1896.
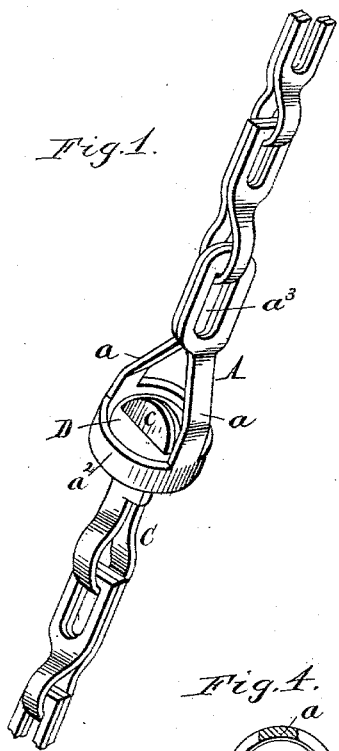
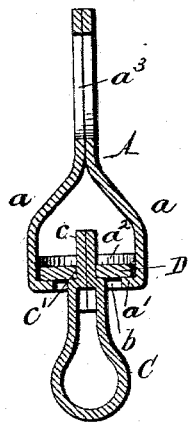
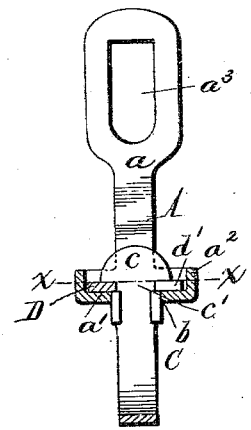
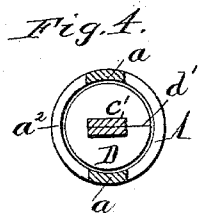
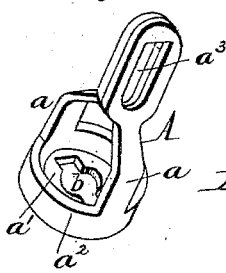
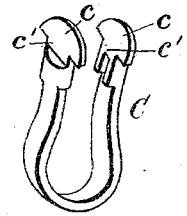
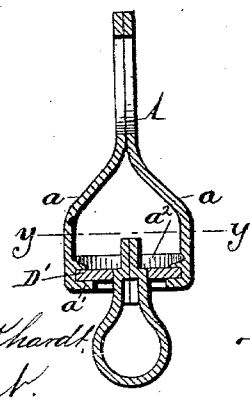
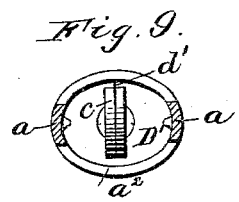
Witnesses:
Chas. F. Burkhardt
Emil Neuhart
W. A. Jameson Inventor
By Wilhelm Bonner
Attorneys.

UNITED STATES PATENT OFFICE.

WILLIAM A. JAMESON, OF NIAGARA FALLS, NEW YORK.

SWIVEL.

SPECIFICATION forming part of Letters Patent No. 556,929, dated March 24, 1896.

Application filed September 13, 1892. Serial No. 445,782. (No model.)

*To all whom it may concern:*

Be it known that I, WILLIAM A. JAMESON, a citizen of the United States, residing at Niagara Falls, in the county of Niagara and State of New York, have invented new and useful Improvements in Swivels, of which the following is a specification.

This invention relates to a swivel which is especially applicable to chains in which a swiveling connection is desired, and more particularly to a swivel which is designed to be stamped out of sheet metal.

The object of my invention is the production of a strong and simple swivel which can be cheaply manufactured.

In the accompanying drawings, Figure 1 is a perspective view of a chain provided with my improved swivel. Fig. 2 is a longitudinal section of the swivel. Fig. 3 is a similar section thereof at right angles to Fig. 2. Fig. 4 is a cross-section in line $x\,x$, Fig. 3. Fig. 5 is a detached perspective view of the link forming one of the members of the swivel. Fig. 6 is a similar view of the loop forming the other member of the swivel. Fig. 7 is a perspective view of the ring or washer whereby the two members of the swivel are connected. Fig. 8 is a longitudinal section of a modified construction of the swivel. Fig. 9 is a cross-section of the same in line $y\,y$, Fig. 8.

Like letters of reference refer to like parts in the several figures.

A represents a link forming one of the members of the swivel and which is composed of longitudinal bars $a\,a$ and a circular plate or disk $a'$, connecting the inner ends of said bars and formed integrally therewith. This plate or disk is preferably formed with a raised marginal rim or flange $a^2$ for stiffening it. The outer enlarged portions of the bars $a$ rest against each other and are provided with openings $a^3$, which receive the adjacent link of the chain, as shown in Fig. 1.

C is a loop forming the other member of the swivel and which is provided at its inner end with a head or enlargement $c$, and between said head and the body of the loop with a neck $c'$, which is arranged in a slot or opening $b$, formed centrally in the connecting-plate $a'$ of the link.

D is a stop or washer applied to the neck of the loop C, between the head of the latter and the inner side of the connecting-plate $a'$, and whereby the loop is connected to the link.

In the construction of the swivel represented in Figs. 1 to 7 the opening in the washer is square or rectangular, and the portion of the neck $c'$ arranged in said opening is correspondingly flat-sided, so that the washer turns with the loop and forms the bearing of the loop on the link. The washer D is split, as shown at $d'$, so that it can be placed upon the neck of the loop after the head of the latter has been passed through the slot in the connecting-plate of the link. In connecting the parts of the swivel the head $c$ of the loop is passed through the slot in the connecting-plate of the link and the split washer is then placed on the neck of the loop, the ends of the washer being separated before applying it to the neck, as shown in Fig. 7, and the washer being then closed around the neck by a cold shut. The slot in the connecting-plate of the link is made of sufficient length to permit the head of the loop to be freely passed through it, and the washer is made larger in diameter than the length of the slot, so that it cannot pass through the slot. As the washer rests loosely against the connecting-plate of the link, it permits the loop to freely swivel in the link. The washer is preferably constructed of bronze or other non-corrosive metal, so as to insure at all times a smooth bearing-surface between the washer and the connecting-plate $a'$ of the link.

In the modified form of the swivel shown in Figs. 8 and 9 the connecting-plate and its marginal flange are made oval instead of circular and the washer D' is similarly shaped, so that it is held against turning on the plate by the surrounding flange of the latter. In this case the opening in the washer is made round and the portion of the neck of the loop arranged in said opening is cylindrical, so that the loop can turn in the stationary washer instead of the washer turning on the connecting-plate of the link, as in the first-described construction.

The link A, with its connecting-plate, may be stamped in one piece from a blank of sheet metal of the proper form, and the loop C, with its neck and head, may also be stamped complete from a single blank or strip, each end of the blank being formed with an enlargement, as shown in Fig. 6, so that when the two enlarged ends of the blank are brought against each other they form the head c.

I claim as my invention—

1. In a swivel, the combination with a link composed of a plate or disk provided with a central opening and side bars formed integrally with said plate or disk, of a loop having a T-head which is adapted to be passed through the opening of said plate or disk, and a split washer seated on said plate or disk and closed around the neck below the head of the loop, substantially as set forth.

2. In a swivel, the combination with a sheet-metal link composed of a plate or disk provided with a central opening and side bars formed on said plate or disk and bent to rest with their free ends against each other, of a sheet-metal loop having a T-head which is adapted to be passed through the opening of said plate or disk, and a split washer seated on said plate or disk and closed around the neck below the head of the loop, substantially as set forth.

Witness my hand this 29th day of August, 1892.

WILLIAM A. JAMESON.

Witnesses:
JNO. J. BONNER,
FRED. C. GEYER.